United States Patent
Lehr et al.

(10) Patent No.: US 10,713,270 B2
(45) Date of Patent: Jul. 14, 2020

(54) EMERGING ISSUE DETECTION AND ANALYSIS

(71) Applicant: SAP SE, Walldorf (DE)

(72) Inventors: Matthias Lehr, Weinheim (DE); Fazlul Hoque, Weinheim (DE); Satya Viswanathan, Wiesloch (DE); Ebin Thomas Kandathil, Dielheim (DE); Andreas Cardeneo, Weinheim (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 15/849,363

(22) Filed: Dec. 20, 2017

(65) Prior Publication Data
US 2019/0188306 A1     Jun. 20, 2019

(51) Int. Cl.
*G06F 16/248* (2019.01)
*G06F 21/10* (2013.01)
(Continued)

(52) U.S. Cl.
CPC ........ *G06F 16/248* (2019.01); *G06F 16/2465* (2019.01); *G06F 21/105* (2013.01);
(Continued)

(58) Field of Classification Search
USPC .......................................... 704/10; 707/722
See application file for complete search history.

(56) References Cited

U.S. PATENT DOCUMENTS

| 7,299,152 B1 | 11/2007 | Moritz |
| 8,090,592 B1 | 1/2012 | Goodall et al. |

(Continued)

FOREIGN PATENT DOCUMENTS

WO     2016200699 A1     12/2016

OTHER PUBLICATIONS

U.S. Appl. No. 15/369,354 (not yet published), filed Dec. 5, 2016, entitled "Data Analytics System Using Insight Providers".
(Continued)

*Primary Examiner* — Hung T Vy
(74) *Attorney, Agent, or Firm* — Fountainhead Law Group P.C.

(57) ABSTRACT

Structured exploration of available data provides insight allowing early detection/analysis of emerging issues. An in-memory database engine applies specialized information sources and filter criteria to an original data set to successively produce various exploration levels. Evidence relating to a particular exploration level (e.g., resulting data subset, metadata indicating chains of information sources/filter criteria) are stored at the user's instruction within an evidence package of the in-memory database. Information sources may be licensed from third parties, and may be present in the in-memory database. To improve computer performance, embodiments may delete results of previous exploration levels outside of the evidence package. Evidence from the evidence package may be displayed to afford insight into relationships between data subsets and an emerging issue. One structured exploration references a source of geographic information (e.g., pipeline location) and another source of (tractor) warranty claim information, to correlate tractor location with an emerging fuel pump issue.

16 Claims, 13 Drawing Sheets

(51) Int. Cl.
    *G06F 16/2458*     (2019.01)
    *G06Q 10/04*     (2012.01)
    *G06Q 10/06*     (2012.01)

(52) U.S. Cl.
    CPC ........... *G06Q 10/04* (2013.01); *G06Q 10/063* (2013.01); *G06F 2216/03* (2013.01); *G06F 2221/0704* (2013.01)

(56) References Cited

U.S. PATENT DOCUMENTS

| | | | |
|---|---|---|---|
| 2005/0108001 A1* | 5/2005 | Aarskog | G06F 17/271 704/10 |
| 2007/0088776 A1 | 4/2007 | Whear et al. | |
| 2007/0223699 A1 | 9/2007 | Jones et al. | |
| 2011/0208742 A1 | 8/2011 | Chakrabarty et al. | |
| 2012/0116630 A1 | 5/2012 | Howell et al. | |
| 2014/0012732 A1* | 1/2014 | Lindores | A01B 79/005 705/37 |
| 2015/0006972 A1 | 1/2015 | Jones | |
| 2017/0177744 A1 | 6/2017 | Potiagalov et al. | |

OTHER PUBLICATIONS

U.S. Appl. No. 15/369,543 (not yet published), filed Dec. 5, 2016, entitled "Data Analytics System Using Insight Providers".

Extended European Search Report, EP Application No. 18195586.5, dated Feb. 4, 2019, 11 pages.

\* cited by examiner

EMERGING ISSUE DETECTION AND ANALYSIS

BACKGROUND

Unless otherwise indicated herein, the approaches described in this section are not prior art to the claims in this application and are not admitted to be prior art by inclusion in this section.

Cost efficiency may be enhanced by early identification and resolution of technical issues associated with a machine. Product engineers thus have a strong incentive for identification and resolution of emerging product issues, to release a corrected revision.

Early identification and resolution of emerging issues is also an important consideration for service technicians. Such technicians need to determine upcoming service needs within their customer-installed base as quickly as possible, in order to quickly react and thereby avoid undesirable machine downtime.

SUMMARY

Embodiments allow a computer to perform a structured exploration of voluminous available data, providing insight for detection and analysis of emerging issues relating to a machine. An in-memory database engine applies specialized information sources and filter criteria to an original machine data set to successively produce various exploration levels. Evidence relating to a particular exploration level (e.g., the resulting data subset, metadata indicating chains of specialized information sources/filter criteria, and links between information sources) are stored at the user's instruction within an evidence package.

When an exploration is started, the user may create an evidence package to collect those findings relevant for the exploration. The created evidence package, together with collected evidences, is persisted (e.g., in the in-memory database) for future reference.

The specialized information sources may be licensed from third parties, and may themselves be present within the in-memory database. To improve computer performance, embodiments may delete the results of previous exploration levels outside of the evidence package. Evidence from the evidence package may be displayed upon request to afford insight into relationships between the data subsets and an emerging issue. An example structured exploration references one specialized source of geographic information (e.g., tractor location, pipeline location) and another specialized source of (tractor) warranty claim information, in order to correlate tractor location with an emerging fuel pump issue.

An embodiment of a computer-implemented method comprises receiving, by an in-memory database engine of an in-memory database, a first input commencing a first structured exploration of an original data set stored in the in-memory database, the input specifying the original data set, a first source of information external to the original data set, and a first filter criterion. The in-memory database engine creates, in response to the first input, a first evidence package in the in-memory database and associated with the first structured exploration. The in-memory database engine applies, in response to the first input, the first source of information and the first filter criterion to the original data set, to generate a first exploration layer comprising a first subset of the original data set matching the first source of information and the first filter criterion. The in-memory database engine receives a second input confirming a relevance of the first exploration level. The in-memory database engine stores in response to the second input, first evidence of the first exploration in the evidence package, the first evidence comprising the first subset, an instance of the first source of information, the first filter criterion, and an identifier of the first structured exploration. The in-memory database engine receives a third input comprising an instruction to display the first evidence. The in-memory database engine communicates, in response to the third input, the first evidence to a screen.

A non-transitory computer readable storage medium embodies a computer program for performing a method comprising receiving, by an in-memory database engine of an in-memory database, a first input commencing a first structured exploration of an original data set stored in the in-memory database, the input specifying the original data set, a first source of information external to the original data set, and a first filter criterion, wherein the first source of information is stored in the in-memory database. The in-memory database engine creates in response to the first input, a first evidence package in the in-memory database and associated with the first structured exploration. The in-memory database engine applies in response to the first input, the first source of information and the first filter criterion to the original data set, to generate a first exploration layer comprising a first subset of the original data set matching the first source of information and the first filter criterion. The in-memory database engine receives a second input confirming a relevance of the first exploration level. The in-memory database engine stores in response to the second input, first evidence of the first exploration in the evidence package, the first evidence comprising the first subset, an instance of the first source of information, the first filter criterion, and an identifier of the first structured exploration. The in-memory database engine receives a third input comprising an instruction to display the first evidence, and the in-memory database engine communicates in response to the third input, the first evidence to a screen.

An embodiment of a computer system comprises one or more processors and a software program, executable on said computer system. The software program is configured to cause an in-memory database engine of an in-memory database to receive a first input commencing a first structured exploration of an original data set stored in the in-memory database, the input specifying the original data set, a first source of information external to the original data set, and a first filter criterion. The software program is further configured to cause the in-memory database engine to crate in response to the first input, a first evidence package in the in-memory database and associated with the first structured exploration. The software program is further configured to cause the in-memory database engine to apply in response to the first input, the first source of information and the first filter criterion to the original data set, to generate a first exploration layer comprising a first subset of the original data set matching the first source of information and the first filter criterion. The software program is further configured to cause the in-memory database engine to receive a second input confirming a relevance of the first exploration level. The software program is further configured to cause the in-memory database engine to store in response to the second input, first evidence of the first exploration in the evidence package, the first evidence comprising the first subset, an instance of the first source of information, the first filter criterion, and an identifier of the first structured exploration. The software program is further configured to cause the in-memory database engine to receive a third input comprising an instruction to display the first evidence. The software program is further configured to cause the in-memory database engine to communicate in response to the third input, the first evidence to a screen. The software program is further configured to cause the in-memory database engine to receive a fourth input to continue the first structured exploration, the fourth input specifying a second source of information external to the original data set, and a second filter criterion. The software program is further configured to cause the in-memory database to apply in response to the fourth input, the second source of information and the second filter criterion to the original data set, to generate a second exploration layer comprising a second subset of the original data set matching the second source of information and the second filter criterion. The software program is further configured to cause the in-memory database engine to receive a fifth input confirming a relevance of the second exploration level. The software program is further configured to cause the in-memory database engine to store second evidence of the first structured exploration in the evidence package, the second evidence comprising the second subset, an instance of the second source of information, the second filter criterion, and the identifier of the first structured exploration. The software program is further configured to cause the in-memory database to receive a sixth input comprising an instruction to display the second evidence. The software program is further configured to cause the in-memory database engine to communicate, by the in-memory database engine in response to the sixth input, the second evidence to the screen.

The following detailed description and accompanying drawings provide a better understanding of the nature and advantages of embodiments.

DETAILED DESCRIPTION

Described herein are methods and apparatuses for implementing detection and analysis of emerging issues. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
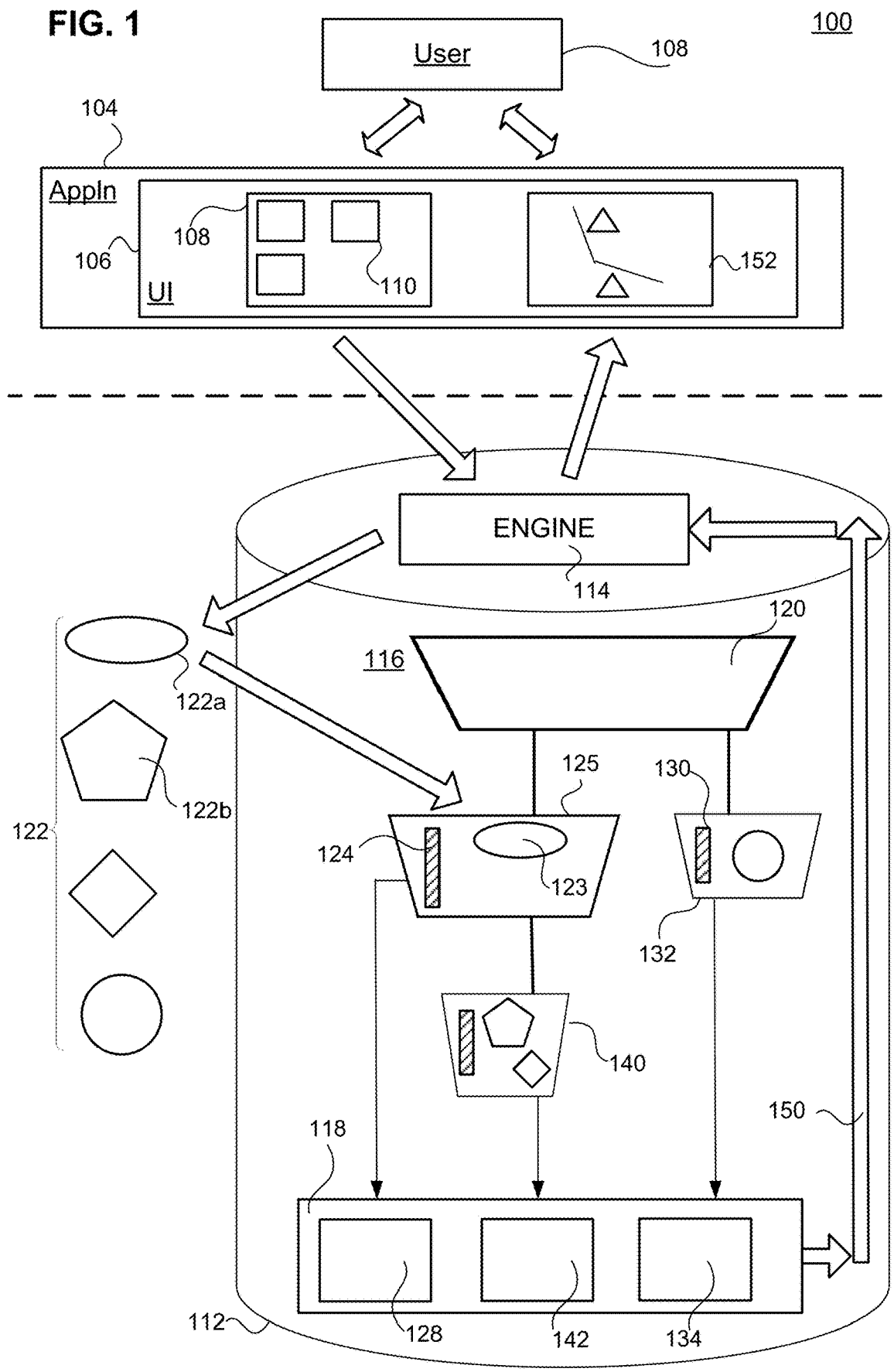
FIG. 1 shows a simplified diagram of a system according to an embodiment.

FIG. 1 shows a simplified view of a system configured to implement detection and analysis of emerging issues according to an embodiment. Specifically, system 100 comprises an application layer 104 having a user interface 106, that is configured to receive instructions from a user 108.

The UI may include a first screen 108 displaying a plurality of different cards 110. As described below in connection with the example, certain high level screens may display a card for each emerging issue that is to be analyzed via structured exploration. One possible example of an emerging issue could relate to a problem with fuel flow in a tractor. Lower level interface screens may include cards for different specialized information sources.

The application layer is in communication with an in-memory database 112 which includes an in-memory database engine 114. The in-memory database has stored therein, an exploration 116 and an evidence package 118 assigned to that exploration.

In particular, the exploration comprises an original data set 120. Continuing with the simplified example given above, the original data set may comprise a total population of tractors of a particular model.

In response to user input to the display screen 108, the in-memory database engine is configured to reference one or more specialized information sources 122 in order to analyze the original data set and yield possible insight into the nature of the emerging issue. For this reason, the specialized information sources are also referred to herein as insight providers (iPros).

Such specialized information source(s) may be available from third parties (e.g., by a licensing agreement). Continuing with the example, one specialized data source 122*a* could be a map that shows the physical location of the tractors.

Figure 12:
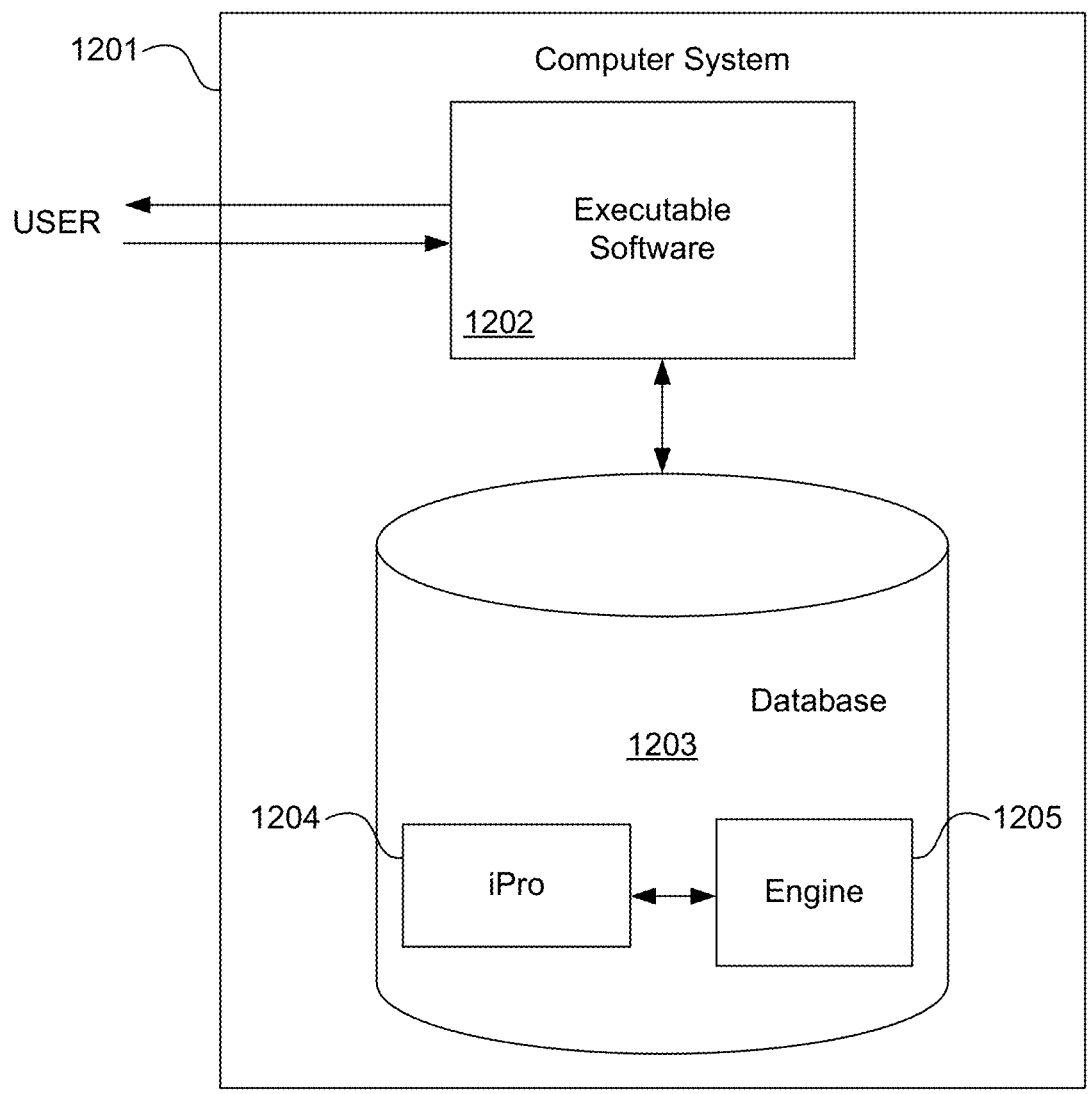
FIG. 12 illustrates hardware of a special purpose computing machine according to an embodiment that is configured to perform detection and analysis of emerging issues.

While FIG. 1 shows a particular embodiment having specialized information sources external to the in-memory database, this is not required. Alternative embodiments may feature one or more of the specialized information sources present within the in-memory database together with the in-memory database engine. Such an embodiment is shown in FIG. 12 and described further below.

The engine then applies to the original data set, an instance 123 of the specialized data source together with a filter criterion 124. Here, for example, the filter criterion could be related to geographical information of the specialized information source.

Application information source and the filtering criterion to the original data set results in the creation of a new level 125 for the structured exploration. Continuing with the example, this new level of the structured exploration may reflect a subset of the tractors having a particular geographic proximity.

Upon the user recognizing the geographic specificity of the new exploration level as offering potential insight to the emerging issue, the engine may store within the evidence package 118 of the in-memory database, the evidence 128 from the new exploration level. This evidence may comprise a data object that includes:

the data subset (e.g., a specific subset of tractors);
metadata of the data subset (e.g., fuel pump part nos.);

data of the specialized information source (e.g., physical locations of a Map iPro);

metadata of the specialized information source (e.g., an ID for the Map iPro; a link between the Map iPro and another iPro);

metadata for the exploration (e.g., a name and an ID for the Fuel Pump Flow Problem exploration).

Storing the data of the new exploration level as evidence in the evidence package, persists the potentially valuable exploration chain for future reference. For example, as shown in FIG. 1, in conducting the structured exploration the user may seek to switch gears and explore the original data set with reference to a different specialized information source 122b. Continuing with the example, that other specialized information source may relate to asserted warranty claims to the population of tractors.

Accordingly, application of the different specialized information source to the original data set together with a filter criterion 130, results in the creation of a new level 132 for the structured exploration. Continuing with the example, this new level of the structured exploration may reflect a subset of the tractors having warranty claims (i.e., irrespective of physical location).

Again, the user may recognize such warranty information as potentially providing valuable insight to the emerging issue. Thus, the user may direct the engine to store the evidence 134 for this branch of the structured exploration, in the underlying evidence package. Accordingly, the data subset as well as the specialized information source and the filter criterion are available for later reference in the course of additional structured exploration.

For example, the user may recognize that the application of data from still other specialized information sources, may provide more insight into the emerging issue. Moreover, the system allows a first subset of data from one exploration layer, to serve as the basis for further structured exploration to create more new exploration layers.

Thus, the user applies still other specialized information sources and filter criteria to the exploration level 124 to create another new exploration layer. And, the results of that further exploration layer (including the refined data set as well as specialized information sources and filter criteria) are stored as evidence 142 in the evidence package.

Upon receipt of instruction via the interface, the in-memory database engine may access 150 the contents of the evidence package for display to the user. Per the simplified example, in FIG. 1 this is shown as screen 152, which includes a map with pipelines depicted as lines and tractor locations indicated with triangles.

Figure 2:
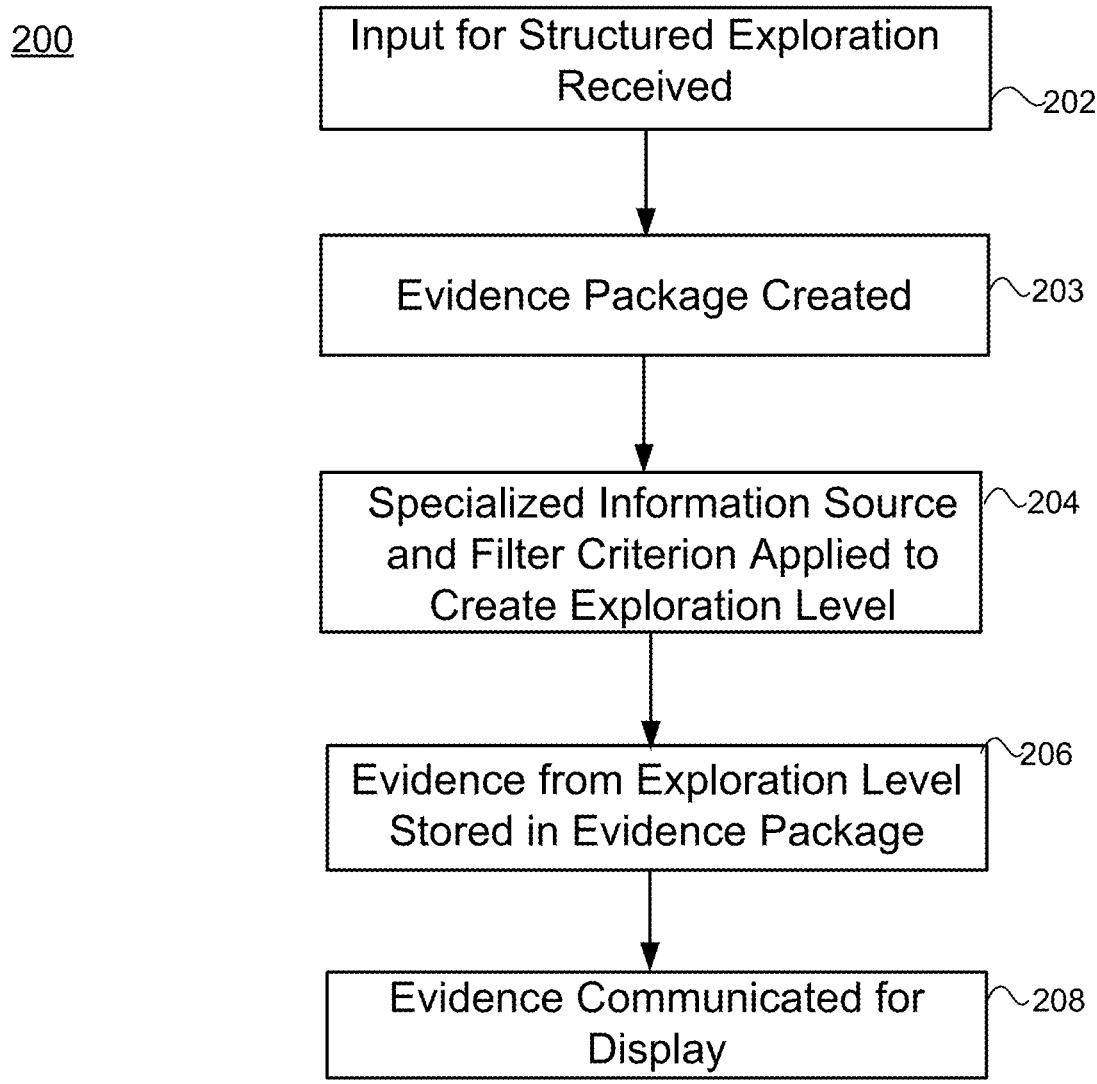
FIG. 2 shows a simplified flow diagram of a method according to an embodiment.

FIG. 2 is a flow diagram showing various actions taken in a method 200 according to an embodiment. At 202, an in-memory database engine of an in-memory database receives a user input commencing a first structured exploration, the input identifying an original data set, a first specialized source of information, and a first filter criterion.

At 203, in response to the first input, the in-memory database engine creates within the in-memory database, a first evidence package associated with the first exploration.

At 204, further in response to the first input, the in-memory database engine applies the first specialized source of information and the first filter criterion to the original data set, to generate a first evidence comprising a subset of the original data set matching the first specialized source of information and the first filter criterion.

At 206, in response to a second user input, the in-memory database engine stores the first evidence in the evidence package.

At 208, in response to a third user input, the in-memory database engine communicates the first evidence from the evidence package for display.

Details regarding the structured exploration methodology, are now described. Embodiments allow early identification of emerging issues based upon an in-depth understanding of machine state and health: past, present, and future. To allow users (e.g., product engineers, service technicians) to achieve this level of understanding, structured exploration according to embodiments supports flexible investigation and analysis of machine data via various information sources—also referred to as insight providers (iPros).

Ordinarily, a potential user who is unskilled in the use of analytical software, may become disoriented by the vast amount of available data that is potentially relevant to machine operation. This confusion may be exacerbated by the various levels of abstraction (e.g., machine, component, sub-component, . . . sensor, reading, reading types . . . point in time, location, etc.) for the available data.

In order to assist an ordinary user in grappling with complex data analysis allowing early discovery of root causes for emerging issues, the structured exploration methodology afforded by embodiments is structured in the sense that only logical next steps in an analysis are made available. For example, a user is only offered the ability to reference iPros that are available and contain data relevant to data set that is being explored.

Such logical next steps may depend upon the current context of the user. Those next steps can include but are not limited to:
  drill-down from set of machines to a single machine;
  switching from error codes to resulting warranty claims for a machine;
  changing a visualization from list to map view.

The structured exploration process offers analysis of an issue for a selected set of machines to detect an existing or emerging problem and its root cause. A structured exploration process starts with a pre-defined data set selected by the user and representing the (machine) population of interest.

Analysis of this population is conducted systematically through the use of available data sources known as insight providers—iPros. Affording flexible and intuitive access to the information offered by these insight providers allows the user to analyze and narrow down the population to identify a problem.

Specifically, the structured exploration process according to embodiments involves an iterative approach of filtering the population by selecting parameters or a subset of the population in the insight providers, and investigating them further with other iPros as warranted by the exploration objective.

These iterations of analysis produce different levels within the exploration. Each exploration level narrows down the population set, with that subset becoming the complete scope/data set of the next exploration level. The user has the possibility of working with multiple iPros and from each iPro narrow down the analyzed population, leading to different chains in the exploration.

A structured exploration process can involve a single user or multiple individuals working together in a collaborative approach. Such structured explorations can be complex, and be conducted over a prolonged duration of time. Thus, the complete state of a structured exploration—including the selected data sets and corresponding insight providers with their context—is preserved by the system in the form of an evidence package.

Various details of implementing detection and analysis of emerging issues according to particular embodiments, are now discussed in connection with the following example of FIGS. 3-4.

Example

Figure 3:
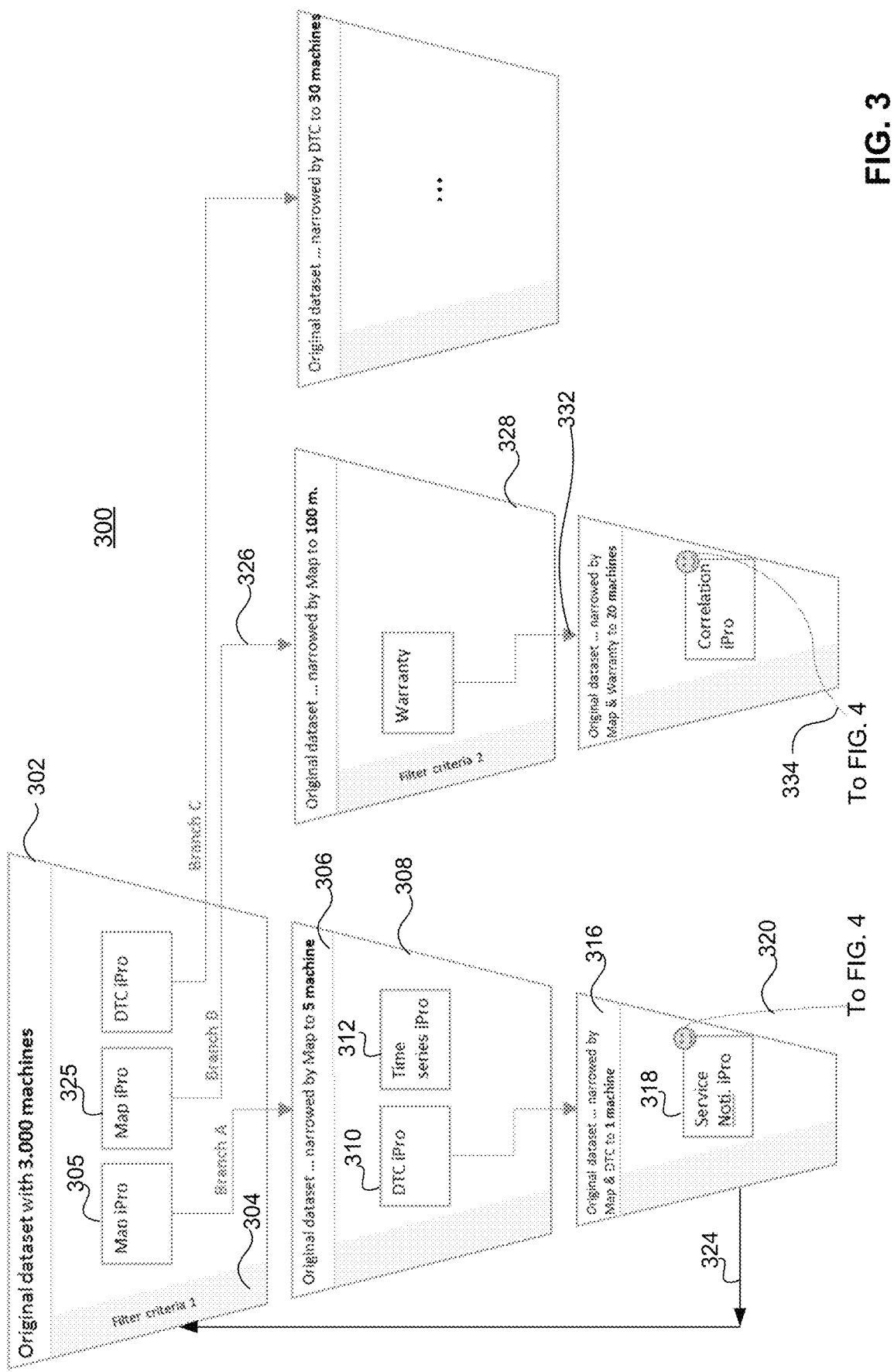
FIG. 3 illustrates a structured exploration of emerging issues according to one example.
Figure 4:
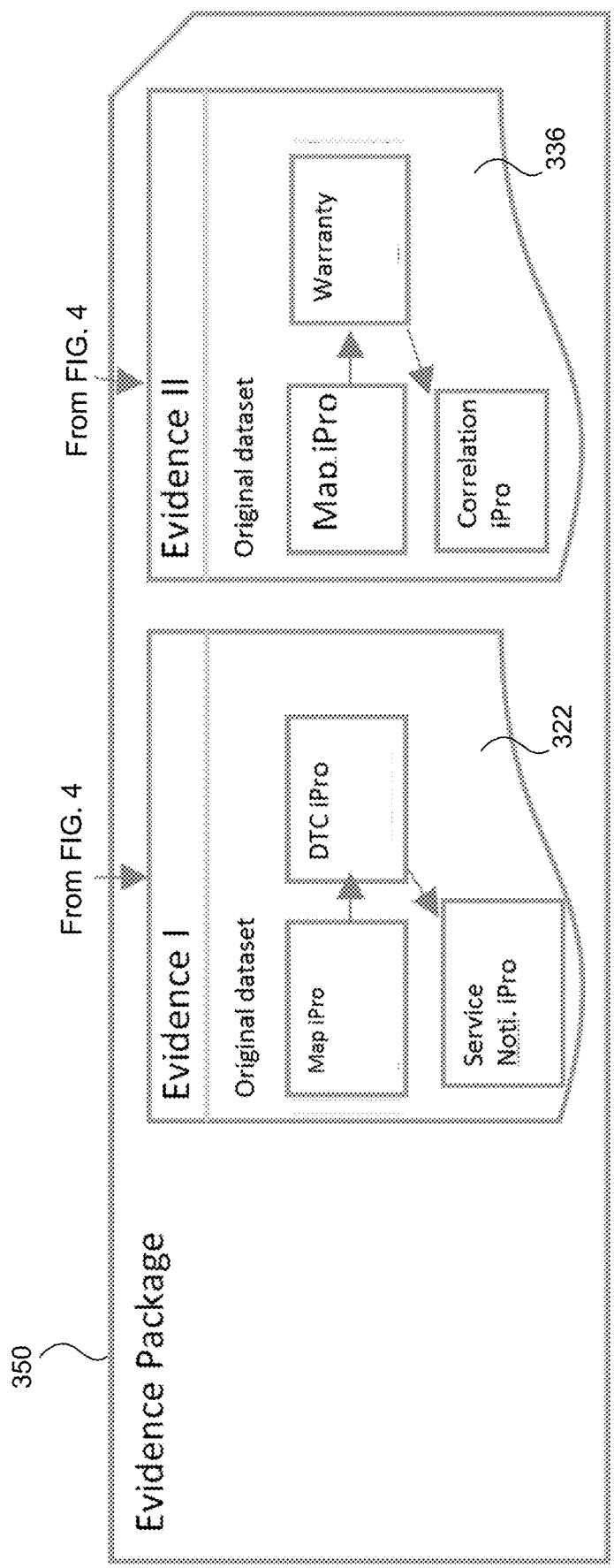
FIG. 4 illustrates an evidence package resulting from the structured exploration of emerging issues of FIG. 3.

In particular, FIG. 3 shows a simplified view of an example of a structured exploration 300 resulting in an evidence package, for an initial data set comprising a total population of three thousand machines. At least the following insight providers are available to provide information that may be useful in identifying and addressing an emerging issue:

Map iPro showing machine location by geographic region;
DTC iPro showing Diagnostic Trouble Codes received per-machine;
Time series iPro showing selected sensor data over time;
Warranty iPro showing machine warranty information;
Service notice iPro showing service notice information;
Correlation iPro identifying commonalities between data sets.

At 302, a user begins an exploration by selecting an original data set. Here, the original data set comprises a population of 3000 machines. According to certain particular embodiments, at the same time that the exploration is begun, the evidence package 350 of FIG. 4 corresponding to the exploration, is created.

In alternative embodiments, commencing an exploration does not necessarily result in creation of an evidence package. An evidence package may only be triggered if the user wishes to save the data as an evidence from his/her current analysis. In that case, the exploration is saved and then an associated evidence package is created and linked to that exploration.

At 304, the user adds first filter criteria to the exploration level. This restricts the available machines for the whole exploration level, creating an original Branch A of the structured exploration. Here, the user adds the geographical Map insight provider under narrow geographic filter criteria to explore the physical distribution of the filtered machines. This creates first instance 305 of the Map iPro.

At 306, the user selects interesting machines within the Map insight provider. For example, certain machines may be considered interesting because they are clustered around a particular geographic location. Via the action "explore further", the user in turn creates a new exploration level (level 2) comprising a data set of the 5 machines selected out of the original 3000.

At 308, the user explores the filtered machine data of the first exploration level, with additional insight provider data sources. Here, the DTC iPro 310 features Diagnostic Trouble Codes (DTCs) per-machine. The insight provider 312 shows time series data for selected sensors in a graph.

At 314, the user recognizes a particular DTC as potentially indicative of an emerging issue. Via the user action "explore further", the user creates a new exploration level (level 3) with a data set comprising the one selected machine exhibiting that particular DTC.

At 316, the user's experience and intuition indicates that available service notifications may shed additional light upon the emerging issue. Accordingly, the user selects the Service notice insight provider 318, and applies same to filter the data of the third exploration level to explore the service notifications of that particular population (here, one machine).

The user recognizes the service notifications as being potentially important information, and desires to preserve them for later follow-up. Accordingly, at 320 the user adds the exploration chain 322 that led to these notifications to the evidence package 350 shown in FIG. 4. That exploration chain comprises the geographic map insight provider, the DTC insight provider, and the service notification insight provider. In this manner the evidence package preserves for future reference, one specific combination of filter criteria potentially offering valuable insight into the root cause of the emerging issue.

At 324, the user believes that warranty claim information may potentially be valuable in diagnosing the root cause of the emerging issue. Accordingly, the user navigates back to the exploration level 1 and the initial data set of 3000 machines. Because the user does not wish to limit such warranty claims to the original geographic region, the user changes (broadens) the selection in the Map iPro, thereby creating a second instance 325 of that iPro. Alternatively, changing the filter parameters within one iPro may serve to change the data set within the current instance.

At 326, via the action "explore further", the user creates a new exploration level based upon the changed (broadened) selection in the Map iPro. This creates a second Branch B in the structured exploration as shown, having a filtered subset of 100 machines. This subset of the second exploration level of Branch B reflects the looser geographic filter criteria input to the Map iPro.

At 328, the user adds the warranty iPro information source 330 to explore any existing warranty claims. By adding this filter criteria, the user narrows the 100 machines even further to only 20 machines.

At 332, the user seeks to select a subset of these warranty claims. By the user action "explore further", the user creates another exploration level with the relevant machines of the previous exploration level. The user adds a correlation insight provider to analyze any existing correlations (commonalities) arising amongst the machines previously selected for relevance based upon the warranty claim selection.

The user recognizes that application of the correlation insight provider offers potentially valuable information regarding the nature of the underlying root cause of the emerging issue. So, in order to preserve that information, at 334 the user adds that second exploration chain 336 (Map iPro and filter criteria, Warranty iPro, Correlation iPro) to the evidence package.

Further details regarding a structured exploration process are now provided. The exploration level represents the scope of the user's current context.

That scope is a set of machines ready for analysis. Even if the focus of the user's analyses is upon warranty claims, the scope is the set of machines having these warranty claims.

The instance of an iPro is part of an exploration level. Adding such an iPro to an exploration level creates a link: (iPro scope link)
between the exploration level and the instance of the iPro: ({level, scope, other context}-{iPro}.

Structured exploration may employ vertical filtering between exploration levels. Such vertical filtering allows the user to select a subset of the scope of an iPro, as the scope for the next exploration level. The subset of the iPro scope then becomes the scope of the next level. This action links the iPro and its context to the level:
(vertical filtering link): {iPro, selection, other context}-{level}.

A Master-Detail relationship may exist between insight providers. Such a Master-Detail relationship between different insight providers ties a detail insight provider to a master insight provider by setting the complete scope of the detail insight provider to the current (user) selected scope of the master insight provider. Thus in the example of FIG. 3, a warranty claim iPro (Detail) shows only the warranty claims recorded for machines selected on a Map iPro (Master).

A master-detail relationship is supported inside an iPro as a design decision of the builder/developer. Absent such a design decision, iPros are typically independent from each other and cannot enter a Master-Detail relationship.

The concept of an exploration chain is now discussed. The exploration chain is the minimum sum of user exploration actions from a data set to an iPro. The exploration chain comprises vertical filtering links and iPro scope links. The exploration chain can be understood as an analysis document laying out the respective iPro instances and their context in the flow of their creating of a data set.

Under some circumstances it may be desirable to explore a machine population data set underlying an exploration level, in multiple directions by evaluating multiple iPros/data points. This is supported by allowing multiple exploration chains in a single exploration (N-Chain Exploration). A detailed discussion of N chain branching is discussed later below in connection with FIG. 7.

An exploration is defined as the sum of all exploration chains by the user starting from the same initial data set.

A current workspace is the current data set with which the user works, together with the iPro instances visualizing that data set (in part or whole). The current workspace corresponds to the current exploration level of the current exploration chain.

If the user navigates between different exploration levels, the data set and iPros of the currently selected exploration level becomes the current workspace. The current workspace may have an indicator to specify the exploration level and the applied/current filter criteria (e.g., with a bread crumb).

The current workspace keeps the user informed about the underlying data set. The current workspace also provides a way of viewing the complete exploration paths/branches at any given exploration level.

A workspace template comprises a list of iPros and their positioning and (internal) context—e.g., filtering, selection. The workspace template allows rapid population of the current workspace with iPros already referenced for an earlier analysis. The workspace template allows the user to quickly transfer potential complex/time-consuming analysis steps from one data set (e.g., machine type A) to another data set (e.g. machine type B).

The list of iPros which a user can add to the current workspace, is the available iPros list. This list may depend upon one or more of the following:
 types and structures exposed by the data set (of this workspace);
 iPro availability (e.g., whether or not licensed to the user); and/or
 additional restrictions placed by the user's organization (whether a particular user is authorized to have access to the iPro).

Figure 5:
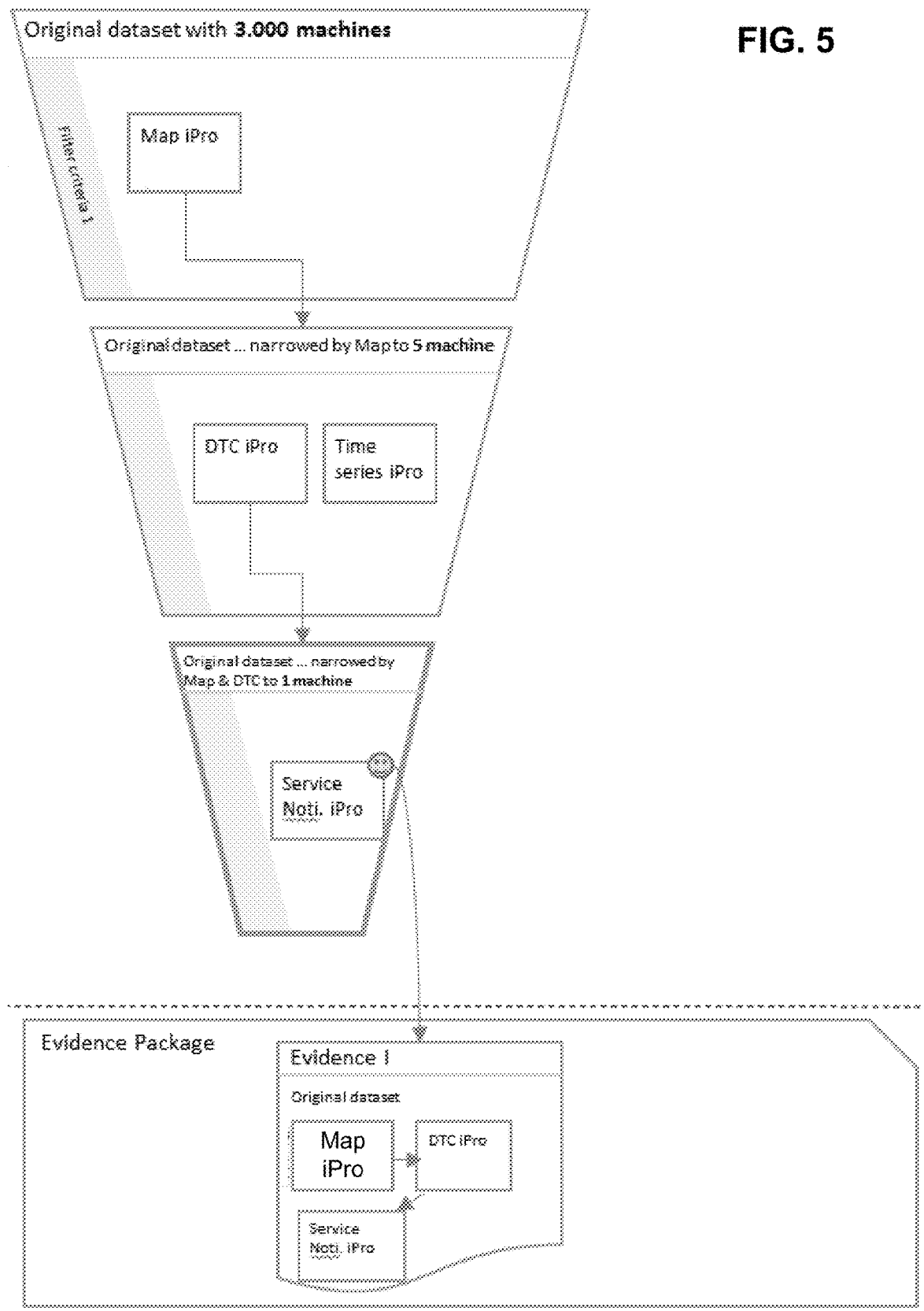
FIGS. 5-6 show a structured exploration of emerging issues according to another example.
Figure 6:
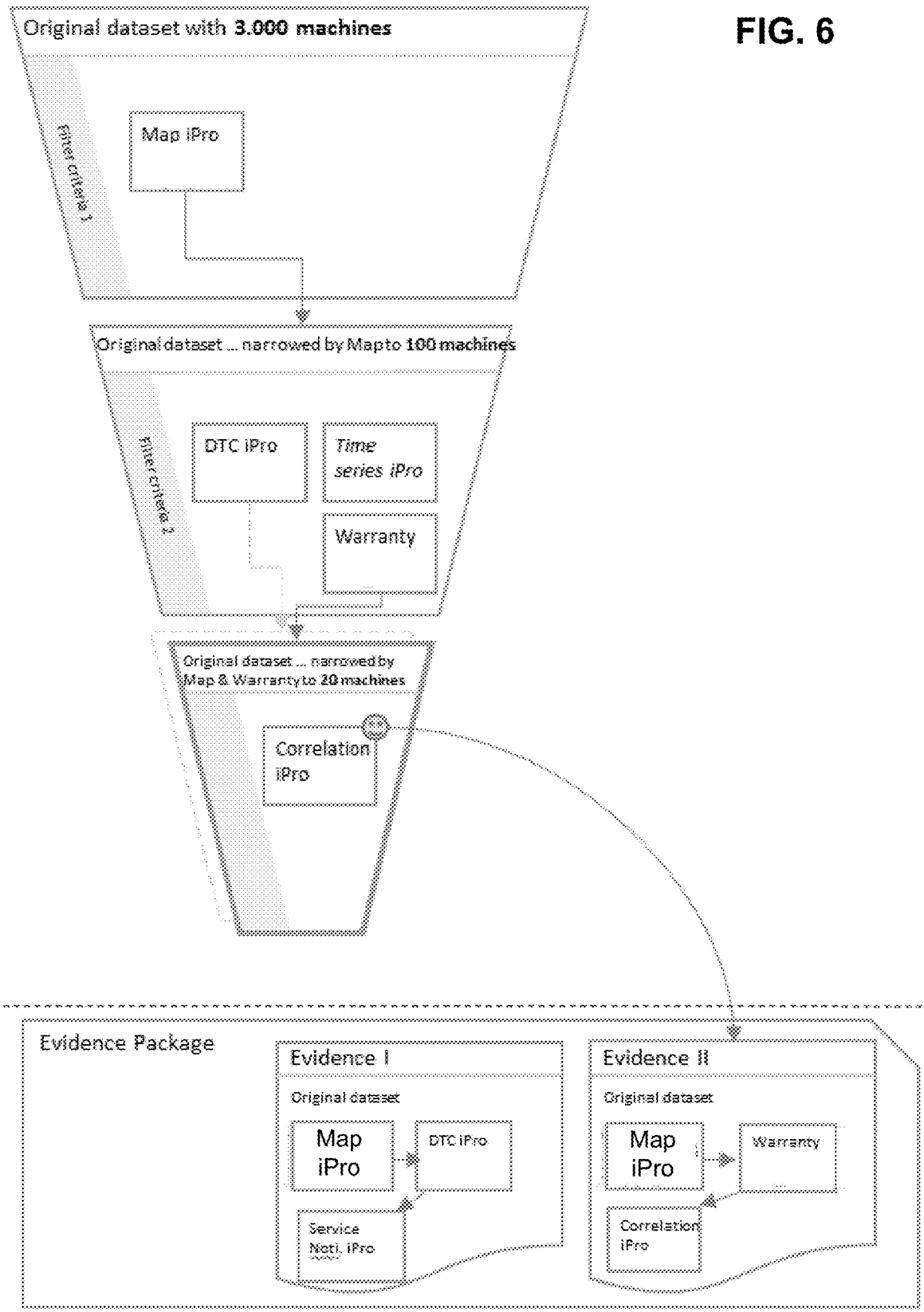

FIGS. 5-6 are simplified views illustrating an alternative embodiment to performing structured exploration of emerging issues according to another example. Here, once the user has performed exploration utilizing the Map iPro of narrow scope (FIG. 5), she desires to change (broaden) the selection in the Map iPro. The user receives a notification that she changed the data sets of the dependent (underlying) exploration levels.

Then, as shown in FIG. 6, while the evidence stored in the evidence package is immutable and does not change, the exploration level dependent on the DTC iPro is deleted, including the link and all containing iPros. A new exploration level dependent on the warranty claims iPro is created.

The user adds a Correlation iPro to analyze correlations. Then, after deriving relevant insight the user adds this exploration chain to the evidence package, too.

This embodiment improves computer operation by leveraging the processing power of the in-memory database engine to create exploration levels. In this manner, memory capacity may be preserved by deleting the exploration levels outside of those particular evidences stored in the evidence package pursuant to the user's specific instruction.

Figure 7:
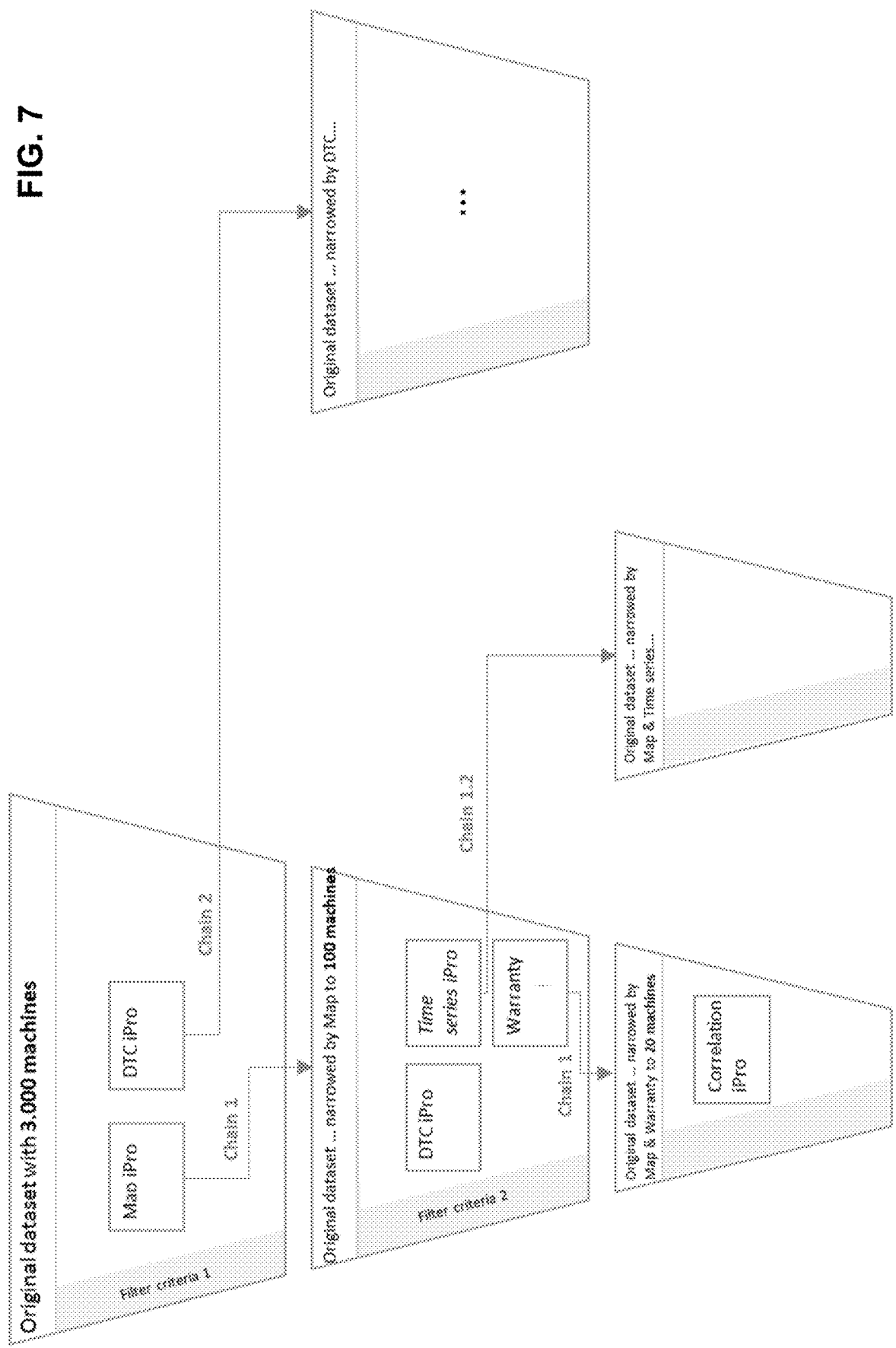
FIG. 7 shows a structured exploration of emerging issues according to still another example.

FIG. 7 illustrates a structured exploration of emerging issues according to still another example. Additionally, in this embodiment if the user wants to explore further from an iPro that has no dependent exploration level, a new chain with a new dependent exploration level is created (e.g., exploration chain 1.2, exploration chain 2). This embodiment allows the user to follow multiple paths of intuition, while avoiding the complex user interactions of branching from the same insight provider.

Figure 8:
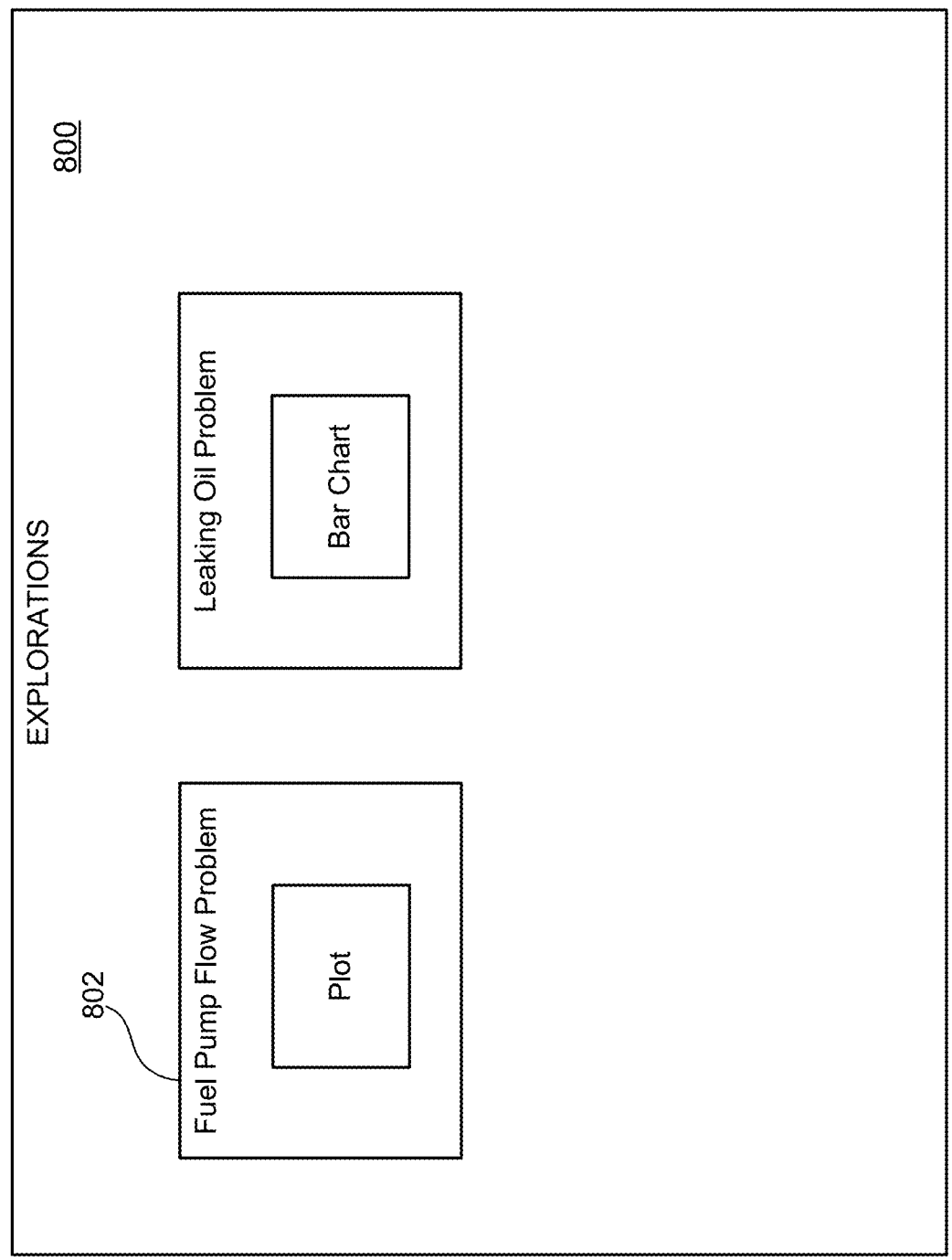
FIGS. 8-10 illustrate simplified screenshots of a user interface for emerging issue detection according to an example.

An overview of "My Explorations" functionality is now provided. All explorations accessible to the user (as creator or collaborator) define the "My Explorations" list. The "My Explorations" overview page shows these explorations. FIG. 8 shows a simplified screenshot of the My Explorations overview page 800.

Each exploration may be represented by a card 802 displaying relevant information. Examples of such visual content may include one or more of:
 title of the Exploration
 creator/invited by (collaboration)
 age (since creation date)
 last accessed in duration (days, weeks, months, etc.)
 volume of evidence (representing a number of snapshots added to the current evidence package)
 number of assets in the population
 number of collaborators
 name of the last contributor (e.g., of evidence or comment)
 status
 'favorite' indicator
 notification regarding number of new messages in the collaboration section
 image (e.g., iPro screenshots/select from a set of images or icons, etc.)

Certain embodiments may have the iPros being used as a cover of the cards, akin to adding a picture to the cover of an album. For example, a time series data iPro used as a cover could be dynamic rather than static, showing current state of the data from the iPro.

A card may display additional meta-data required for searching capabilities. Examples of such meta-data can include but is not limited to:
 user defined tags
 global filters
 names of iPros used.

The user can execute specific actions on each card, e.g., for each exploration. Such exemplary actions on exploration cards can include:
 sort by (title, last accessed by, or age, by creator, or by an invited contributor)

show (only Active explorations, Send for Review explorations, closed explorations)
open explorations
set as favorite.

An exploration can have three states. In an Open state, the exploration is created and accessible to the owner/creator and all invited users (collaborators). An open exploration can be moved into review or be closed.

Under an In Review state, the exploration is provided to users other than the owner/creator and collaborators. In this state the exploration is available for consumption in follow-on processes. An example of such a follow-on process is to redesign the next asset revision to fix an emerging issue in product design. An exploration that is in the In Review state can be closed or re-opened.

In a Closed state, after the follow-on process finished (e.g., the product redesign is done and the positive effect verified in the field), the exploration can be closed and archived for further reference. A closed exploration may not be able to be re-opened.

Details regarding the evidence package according to particular embodiments, are now described. An evidence package is a collection of various exploration results saved for future reference by business users (e.g. a product engineer), while exploring diverse data sources that help to describe a potential large-scale issue and identify potential root causes of these issues. These data sources may include but are not limited to: warranty claims, service messages, and customer complaints. The collected pieces of evidence may be used in subsequent processes to address the problem, for example in a form of a product improvement.

The user can select a data point in any level of the exploration to add to the evidence package. Examples can include but are not limited to the following.

A pattern describing the issue may be added to the evidence package. One example is a particular machine alert (e.g., 4711).

A list of affected machines may be added to the evidence package. Which machines have exhibited the issue in the past? This can be defined using a filter on the data element describing the issue, e.g. which machines have shown the pre alert? Which machines have had a notification on the functional location?

A list of potentially affected machines may be added to the evidence package. Which machines are possibly in focus for this issue (e.g., the population)?

A list of components/functional locations affected by the issue, may be added to the evidence package.

A list of spare parts which might be needed to address the issue, may be added to the evidence package.

Hints helping to identify the root cause may be added to the evidence package. Thus using statistical methods, it may be possible to generate hints for root cause analysis. Examples for such statistical analysis can include machine options comparison, or patterns in sensor data indicative of imminent failure.

A list of occurrences of the issue may be added to the evidence package. When, and on which machines has the issue previously occurred? This can also be defined as a filter for:
a list of machines affected by a related pre-alert,
a list of machines affected by a related machine-generated alert, and/or
a list of machines affected by a related service message.

It may not always be possible to describe the affected machines using a filter. A manual selection may be appropriate. For example, there may be several issues related to one functional location, so filtering the messages for this specific functional location may not be sufficient (e.g., may identify multiple emerging issues).

Reference to the evidence package may help to fulfill one or more goals of the user. Examples can include finding root causes for large-scale issues, improving product design and quality, and the identification of recurring patterns.

Evidence packages may facilitate various user tasks that are involved in different exploration types. An unknown structured exploration type refers to a task where the user initiates the root cause analysis where the problem is unknown, and collects evidence that seems to be related. This is also known as inductive reasoning.

A focused structured exploration type refers to a task where the user initiates the root cause analysis for a particular identified problem, and collects only evidence for that specific problem.

A focused structured exploration with diverse evidence type, refers to a task where the user starts the root cause analysis for a given problem, but finds evidence related to another (existing or non-existing) problem/exploration. There, newly-found evidence may belong to one or multiple structured explorations.

The creation of an evidence package is now described. As mentioned above, according to some embodiments an evidence package may be assigned to an exploration by default when an exploration is created.

Alternatively, an evidence package may be created out of exploration at any point in time. When created, the evidence package is an empty container which can be used to collect evidence. The evidence package may only be active if the user saves the data as evidence from his/her analysis—otherwise the evidence package can also remain as empty.

If an exploration is not saved and the evidence package attached to the exploration is also empty, then the evidence package may also be deleted. However, if the evidence package attached to an exploration is not empty, then the exploration should be saved or the evidence package explicitly emptied before the exploration is closed.

Figure 9:
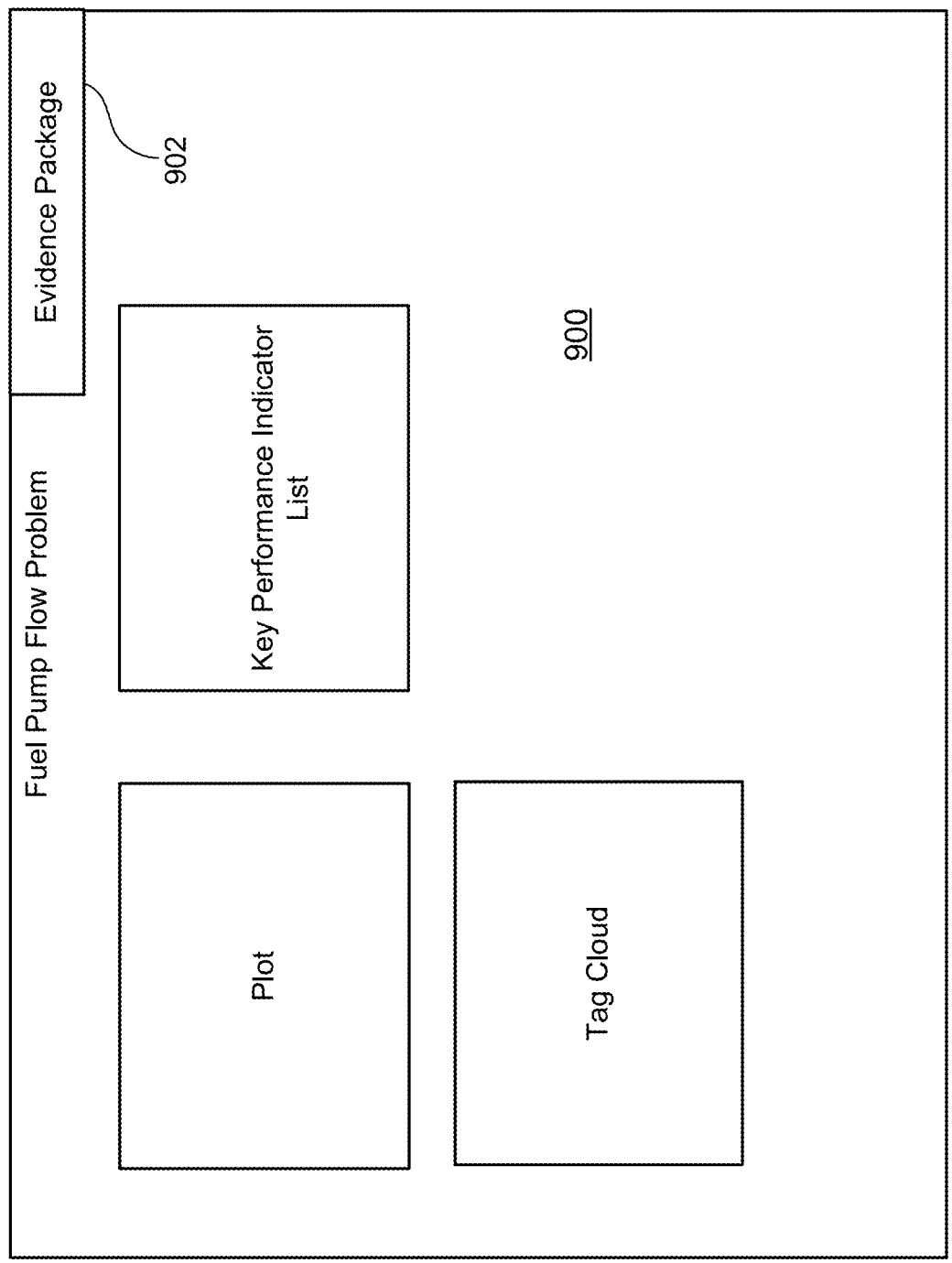

In the user interface, an evidence package tab may be displayed. This is shown in as 902 the simplified screen shot 900 of FIG. 9. While the interface tab for the evidence package tab is displayed, a back-end object for an evidence package may not yet exist, and the evidence package itself can be empty until a user adds evidence.

Thus the evidence package section may be empty (meaning no object is created in the background), and acts as a place holder on the UI for adding evidence. An object for the evidence package is created and saved when the data is added to the evidence package.

In certain embodiments, saving the exploration for which the evidence is being created, serves to link the evidence package to the exploration. According to some embodiments, a user adds evidence to the evidence package which is saved by clicking on the save button.

Figure 10:
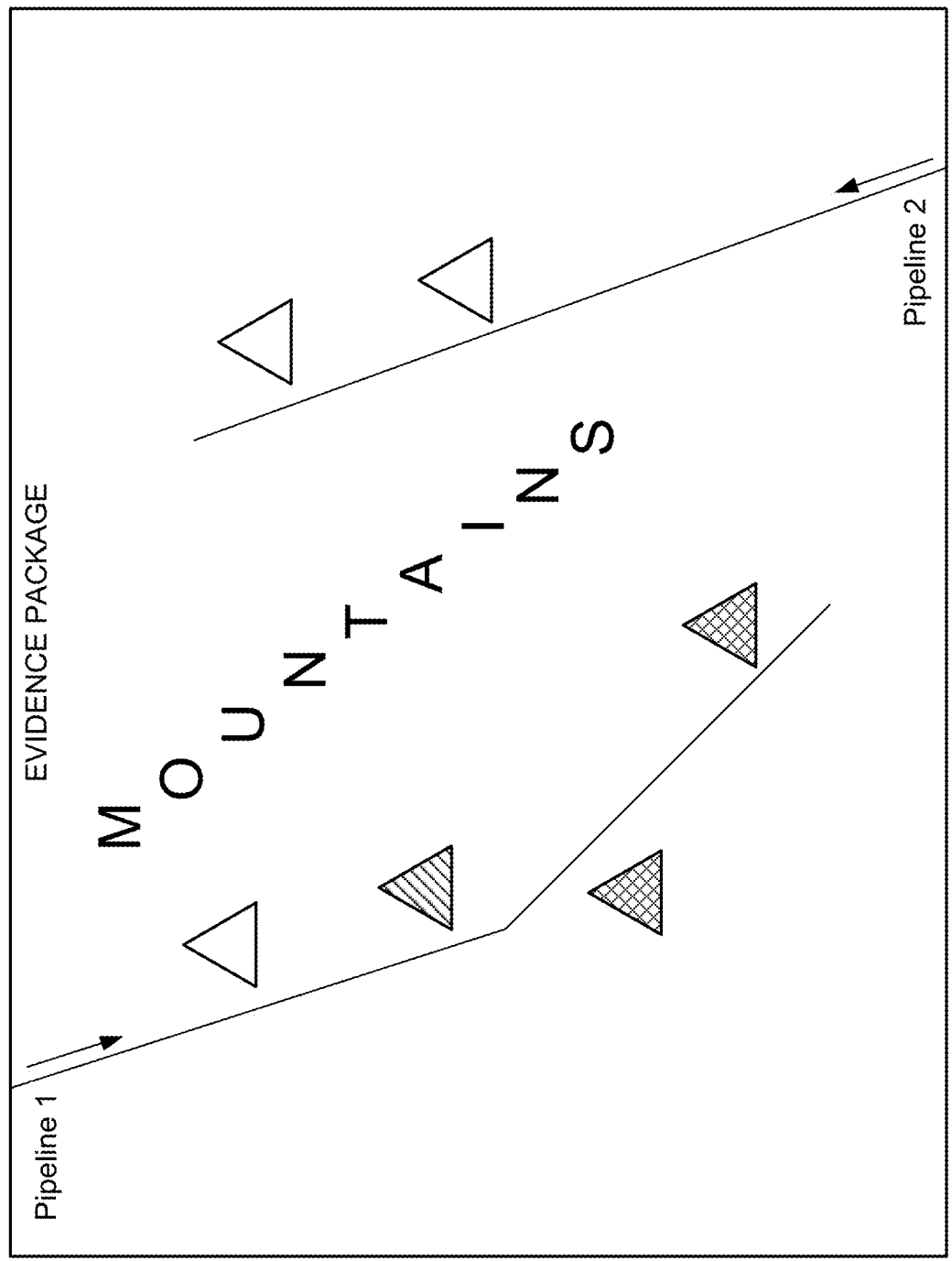

FIG. 10 is a simplified screenshot showing an example of an evidence package. Here, the exploration chain comprising •the narrow geographic Map iPro instance, •the DTC iPro, and the •Service notice iPro of Branch A of the structured exploration of FIG. 3, permits visualizing machine locations (triangles) relative to fuel pipelines that are separated by a mountain range.

The filtering with criteria from other iPros allows the evidence package to provide further information relevant to the emerging Fuel Pump Flow Problem. Namely, single cross-hatching may reveal DTCs as applying only to machine locations along the first pipeline. Moreover, double cross-hatching may reveal service notices as applying only to machine locations at a particular distance along the first pipeline.

In this manner, the evidence package may allow a user to confidently associate the emerging fuel pump problem with a specific pipeline. Moreover, the evidence package may further allow the user to begin associate that same problem with a particular pipeline location.

The exploration may need to be saved for the contents of the evidence package to be persisted after the exploration has Closed. An evidence package may not be able to be saved independently without the corresponding exploration. In some embodiments, an evidence package may have only a 1:1 relationship with the exploration for which it was created.

Each evidence package may have attribute(s) taken from the structured exploration to which it is assigned. Examples of such attributes can include but are not limited to:
- exploration name;
- short description of exploration;
- creation date of exploration;
- identity of person contributing data to the evidence package (that can be a creator of evidence package, or a contributor who is invited to collaborate in the exploration);
- evidence package status (e.g., New, In process, Closed, etc). Evidence package status may be changed by modifying the evidence package based on the progress made with the root cause analysis.

Other attributes may be related only to the evidence package itself (rather than the assigned structured exploration). Examples can include but are not limited to:
- the name of the evidence package;
- a decision/overall Comment Field;
- a closing date (when status changes to "closed" the closing date will be taken automatically by the system);
- decision taken by (one or more employee names);
- snapshot specific comments (property of insight provider);

During structured exploration, the user may discover evidence contributing to another problem for which no current exploration exists. The system may allow the user to add the evidence to a new exploration. The existing exploration may be replicated and saved with a new name.

Later on, a user can continue to add or remove evidence to that newly created exploration and corresponding evidence package. The replicated new exploration may be saved together with the properties of existing exploration, including the evidence package. Where another exploration already exists, newly found evidence may be added to the existing exploration and evidence package.

Figure 11:
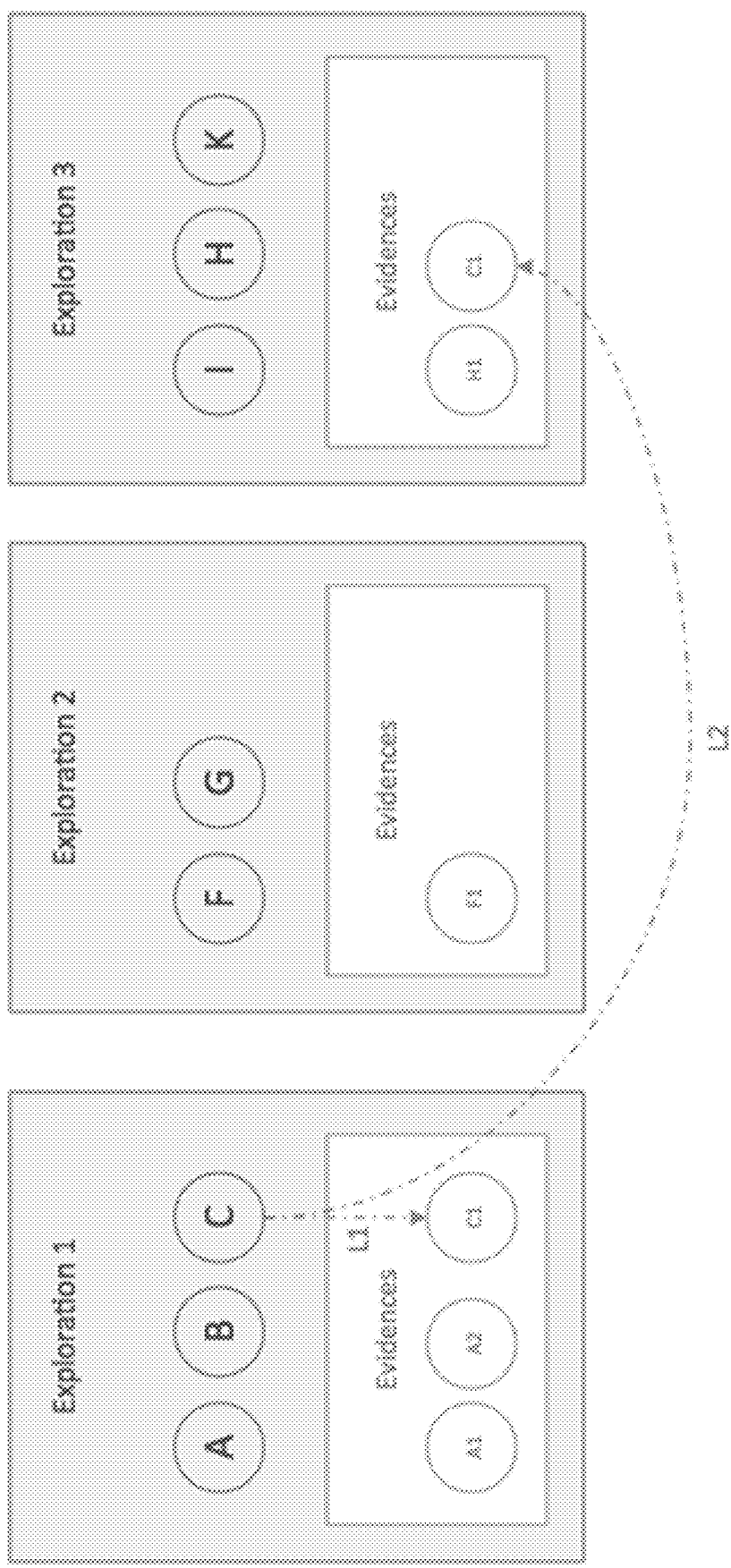
FIG. 11 illustrates a simplified schematic view of managing evidence between structured explorations.

Certain embodiments may include a provision allowing navigation back to identify how a user arrived at the added evidence. FIG. 11 is a simplified diagram illustrating this aspect.

In particular, FIG. 11 illustrates different possibilities of how a user may manage evidence between structured explorations. The boxes each represent one exploration (1-3). The circles (A-C, F-G, I-K) each represent one insight provider.

The boxes within the boxes represent the evidence package of the current exploration. Circles (A1, A2, C1, . . . etc.) represent the evidence that are instances of one insight provider with a defined snapshot of the data.

In a first option, evidence is added within the same exploration. The user discovers evidence (C1) and adds it to its evidence package. This is the standard case indicated by the line L1.

In a second option, evidence is added in a different, already existing exploration. In "Exploration 1" user finds an evidence (C1) that is relevant for another exploration which is already existing (i.e. "Exploration 3"). The user should be able to add it to the evidence package of "Exploration 3". This is indicated by the line L2.

Here, the insight provider with its current snapshot data and filters, is added to the "Exploration 3" even though the exploration might not have that insight provider used in its exploration. The user also remains in the current exploration ("Exploration 1") and does not navigate away.

According to a third option, evidence is added in a different exploration that is not already existing. Thus in "Exploration 1" the user finds an evidence (C1) that is relevant for another exploration that is already existing (i.e. "Exploration 4"). The user shall be able to add the evidence to a new exploration by replicating the existing exploration (such as "save as" with a new name). The user then continues working with the new exploration ("Exploration 4").

FIG. 11 shows the newly added evidence in Exploration 3. Navigation may be provided in chronological order to the evidence in the initial exploration (Exploration 1) that concludes with the new evidence in Exploration 3.

The addition of evidence to an evidence package is now described. Adding initial evidence to the evidence package involves copying the insight provider in the exploration page from which the evidence is being added, to the evidence package section, along with the contents being shown at the time of adding the evidence.

Each time the user adds particular evidence to the evidence package, the context of the evidence is saved together with data. This context can include the insight provider name, global filters, an insight provider local filter, and insight provider user configuration and settings. Global filters are preserved but may not be shown by default in the interface unless specifically selected by the user.

When an insight provider is added to the evidence package, the content of the insight provider and the related context is the snapshot data at that point in time when it is captured. In some embodiments each captured evidence may have a one to one relation with the assigned evidence package.

When adding new evidence, an evidence snapshot of an iPro may already exist. Under such circumstances, it may be possible to browse through the instances of the snapshot, then duplicate the insight provider. This ensures that only the single snap shot of the insight provider will be displayed in the evidence package, while other instances of the insight provider remain accessible.

Although the insight provider is copied, one or more of the following functionalities may still be available within the evidence package:
- going to the full screen mode of the insight provider;
- filtering/searching in the insight provider;
- viewing the "Preview Mode";
- accessing details of objects (snapshot).

The life cycle of an evidence package is now discussed. The evidence package chain may have an ascending order as the default sorting. That is, the latest added evidence is at the end of the evidence package. The user may re-arrange the evidence according to personal requirements, and alignment of the evidence may be centrally aligned.

For purposes of collaboration with other uses to address issues, a share function may be implemented. The evidence package and related attributes assigned to the exploration may be shared along with the shared exploration.

An exploration and evidence package may be deleted by being designated as obsolete. The evidence package is a part of the exploration, and its life cycle is also maintained with the exploration. As mentioned above, the evidence package is created with an exploration. However, it shall be possible for the user to delete instances or the complete set of evidences added to an evidence package.

A print function is available. Printing of the evidence package may be based upon standard print functionality of the browser. "Print all" prints visible content of the evidence package. "Print Pages" results in the printing of selected pages. "Print Description" prints only the descriptions and comments available in the evidence package, rather than images or snapshots of the evidence. Certain embodiments may involve printing of instances as well as their relevant details (e.g., Snapshot and preview).

An administration function appoints an administrator as the creator of an exploration. This allows the user to add/modify evidence in the evidence package.

Modifying the evidence package is now discussed. Details of an evidence snapshot may be displayed as follows. Out of the evidence package, it is possible to go to the full screen mode to see the details of the added evidence. For those insight providers (e.g., work activity) having details or a preview page, it is possible to navigate to details pages.

The responsible/primary contact may be changed. The administrator of the application may be able to change the responsible or primary contact of the evidence package from of the users to whom the evidence package is already assigned.

Users with special authorization are allowed to add or modify evidence in the evidence package. All users with whom the exploration is shared, may by default be assigned read only authorization privileges. The exploration creator may be able to change the rights specifically for users. This ensures that only authorized users are making changes to the exploration and evidence package. It also controls the evidence package process chain and maintains the authenticity and purpose of the evidence package and the exploration for what it is created.

Users with special authorization may be allowed to change the title of an exploration and evidence package. The status of an evidence package may be changed.

In certain embodiments the evidence package may have the following four states.
  In progress (default—at creation): from the time evidence is added to an evidence package, to the time when a relevant business process is initiated, the evidence package remains in the 'In-Progress' state.
  Send for review: when the evidence package is shared with users other than the working group (e.g.: management for decision making), it will be in "Send for review" status. In this review mode no changes to the evidence package are possible.
  Monitoring: following review, the Evidence Package can be monitored to check if the actions taken have resolved the issue. This puts the Evidence Package in 'Monitor' state.
  Closed: when the issue needs to be worked on further, the Evidence Package can either be placed in 'Closed' state or back to 'In-Progress' state. The Closed state indicates that the action/results of this exploration are taken care of and follow up action is initiated. When setting the status to Closed, the Decision/overall Comment Field may be filled with a short summary of decision and actions. A closed exploration may not be re-opened. If such a situation arises, then a new exploration may be created and continue to be worked on.

As mentioned above, it may be possible to mark an evidence package as obsolete (e.g., for explorations that no longer make sense for which further activities are not needed). For an administrator and/or user it may be possible to mark as obsolete, the exploration and accompanying evidence package. Deletion can be possible after a certain period time following closure (e.g., 2 years) and no related activities taken place in this period of time. Evidence within an evidence package may be deleted. By making the exploration obsolete, it can be retrieved for future reference and fully deleted only after a certain time period.

It is possible to rearrange the evidence within an evidence package. In certain embodiments this may be accomplished by dragging and dropping the evidence in the desired solution. The same behavior of "Edit Layout" with drag and drop as in related applications, may be used.

Notes and/or comments may be added to an evidence package. Together with the snapshot of the evidence, it is possible provide and show notes or descriptions and assign them to the Evidence package.

An evidence package may be searched. The created evidence package may be searchable with filter criteria such as name, date, status, and responsible creator.

Management of the evidence package is now described. The exploration application may have a section with the list of evidences packages created or assigned to the user (e.g., through collaboration). This can provide an overview page of the evidence.

Navigation within an evidence packages may be based upon the exploration application standard navigation. Opening an evidence package from the overview list opens the exploration and shows the evidence package tab by default.

Summaries of evidence packages may be provided. A summary of the existing evidence packages may need to be displayed on top of the evidence package summary tab as configurable key performance indicator (KPI). The existing key figure insight provider can be customized for this purpose. This may include information about the number of explorations, including status (e.g., in progress, review, monitoring, and closed). Each evidence package may have a summary of number of snapshots available and last updated details.

Publication of an evidence package is now discussed. Publishing of an evidence package is a mechanism to share evidence having multiple levels of information and snap shots of different times. Instead of trying to merge these into a single long document, publication facilitates sharing an interaction report of the evidence using the same application design and behavior of the exploration system. Thus, the application allows storing of the evidence package in a server, with users accessing it using the following methods.

According to a publish and subscribe method, when an evidence package is added or modified in the server, subscribed users will automatically receive an email notification with the URL to access the newly added or updated evidence package.

A request for information method allows specifically searching for an exploration and evidence package by providing details such as creation date, closing date, exploration name, etc.

Embodiments of systems implementing structured exploration may exhibit one or more of the following attributes. First, the user shall start the structured exploration based up on a selected data set The user can add as many iPros as necessary in each level of the exploration. This can be accomplished either from the iPro Catalog or via a search functionality.

The available set of iPros may be the same on all exploration levels. The user may be able to remove iPros from the exploration. The user shall be able to edit the configuration of an iPro.

The user can iteratively create vertical filtering links and iPro scope links by respective selection and navigation in iPros. This serves to implement the structured exploration process.

New vertical filtering links (tying a new exploration level to the source iPro) or iPro scope links (tying an iPro to an exploration level) at the end of an exploration chain are simply added and extend the exploration chain.

In the middle of the exploration chain, a new vertical filtering link or iPro scope link branches the exploration chain. The resulting new chain comprises the complete (partly new) exploration chain from data set to last iPro.

The system may provide an overview of the complete exploration, including all chains. The user shall navigate freely in an existing exploration—backward, forward—and between chains.

The system may provide an overview of the exploration that includes its chains. By default this overview may be shown on the UI only by demand.

The interface may allow a user to be aware of a position in the exploration. The user may add the current iPro (in its current context) to an evidence package. In this case, the iPro (including its context) and the exploration chain leading up to this iPro are added to the evidence package.

The user may be made aware that there is a data change (e.g., more available data) if the exploration is opened again and more data is part of the underlying machine data set (e.g., more time series data).

An exploration can be viewed by multiple users simultaneously. However, only a single user can change the exploration concurrently.

Certain embodiments may automatically save explorations in the background. No user interaction is required for this.

For iPro handling, the user shall add an iPro from the available iPro list to the current workspace. When selecting, the user can add multiple iPros at the same time.

The user may add an iPro using the quick search functionality feature. There, users can search and easily include an iPro to the current workspace. When selecting from the quick search functionality, the user adds one iPro at a time.

The insight providers may have a set of generic functions as well as specific actions as deemed necessary. Such generic functions can include adding, removing, refreshing, and changing visualization of the data in the iPro. Other generic functions can include editing the configuration and also the functionality to select and analyze the complete or a subset of the data used in the iPro. Specific functions might include, e.g., that the geographic mapping iPro should have capabilities to show additional layers—weather, pipeline, etc, or pinning an iPro as cover of the exploration.

For embodiments that allow pinning an iPro as the cover of the structured exploration, the current content/visualization of the iPro will be displayed in front of the exploration card as visualization. This is shown in the simplified exemplary screen shot of FIG. 8 having a plot pinned to the card for the "Fuel Pump Flow Problem" structured exploration. A maximum number (e.g., 3) of iPros can be pinned to an exploration. It may be possible to rapidly show near real-time data (e.g., from the in-memory database) based on the iPro, with cards of interface screens also being dynamically updated.

The user may be able to delete an iPro from the current workspace. This removes the iPro and its context.

The user may undo a deletion of the last deleted iPro. The iPro is added to the workspace again, including the formerly active configuration, selections etc. The position may change compared to before the deletion.

If an iPro is the starting point of a detailed exploration (the iPro links to more detailed Exploration Level)—deleting the iPro also deletes the dependent exploration level(s).

The workspace allows tile-based organization of the iPros. Insight providers can be resized and moved in a grid with predefined horizontal and vertical sizing. The workspace may be responsive to support different screen resolutions.

The iPros will adapt to the available screen space. Insight providers can be expanded to convert them to full screen views and optimized for maximum real-estate available. The workspace may automatically re-layout the iPros based on the user command. Newly added iPros can be added to the workspace from left-to-right and top-to-bottom. The last added iPro is active and scrolled into view.

The user may be able to save the iPros (including their positioning on the current workspace) as a user-named workspace template. The user may be able to populate the current workspace with (additional) iPros from a workspace template.

Where an iPro is from a workspace template, the user may be informed which iPros are incompatible with the current workspace (and more specifically, incompatible with the underlying data set). The user shall then have the option to cancel the action (do not populate the workspace).

The iPro administrator may enable/disable the usage of iPros for a specific user or user group. The iPro Administrator may be able to retrieve a list of all iPros with their respective status (e.g., in development, in testing, released) and license status (e.g., 3rd party—full license, 3rd party—test license, self-developed, open source).

The received information can be stored as a PDF file or printed on paper according to the user requirement. As mentioned above, according to certain embodiments printing may occur via the standard print functionality available in the browser.

Certain embodiments may be implemented in connection with an in-memory database, with the in-memory database engine performing one or more of filtering and evidence package creation functions. FIG. 12 illustrates hardware of a special purpose computing machine configured to implement analysis and detection of emerging issues according to an embodiment. In particular, computer system 1201 comprises a processor 1202 that is in electronic communication with a non-transitory computer-readable storage medium comprising a database 1203. This computer-readable storage medium has stored thereon code 1205 corresponding to an in-memory database engine. Code 1204 corresponds to an insight provider. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 13:
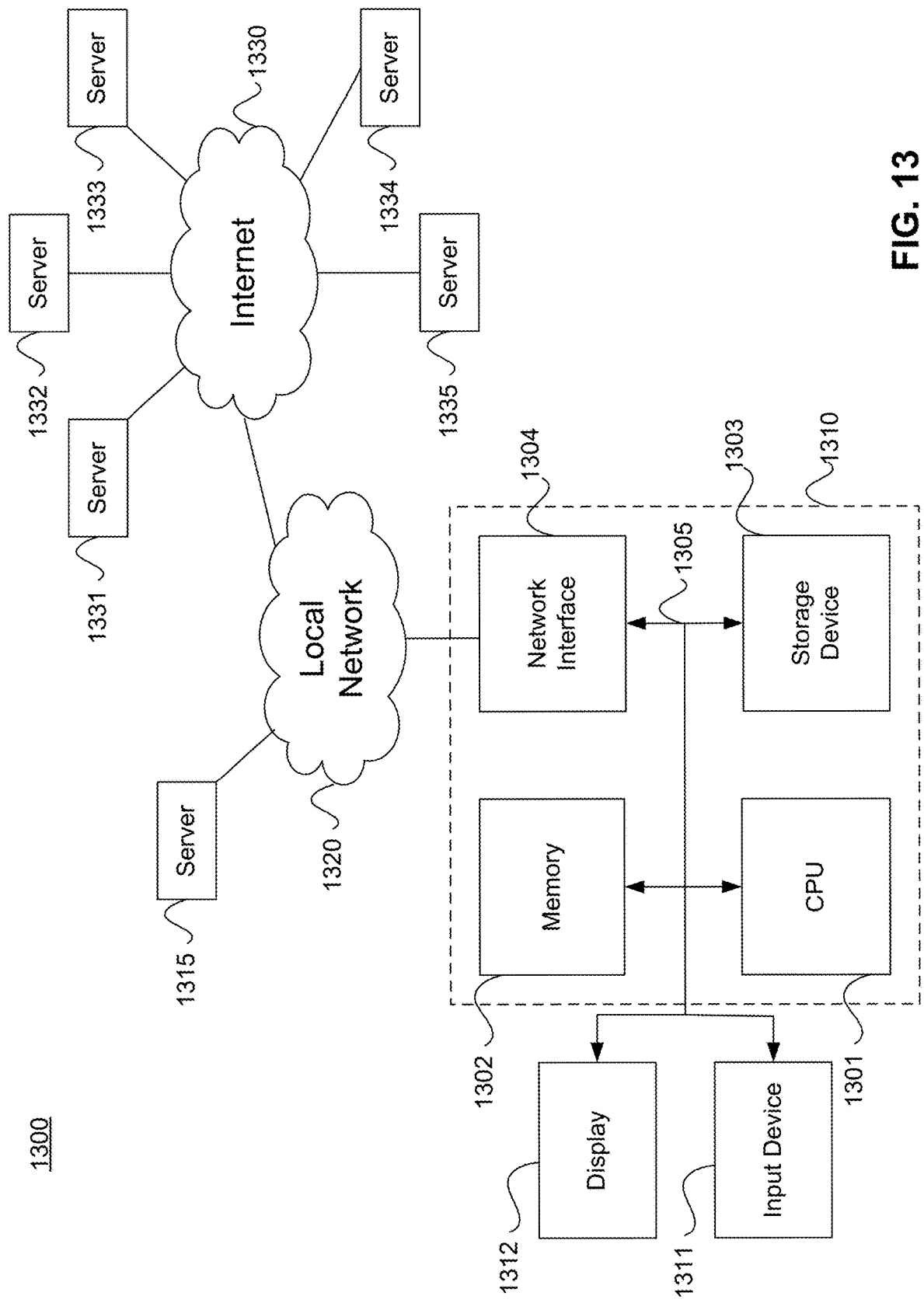
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 605 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, by an in-memory database engine of an in-memory database, a first input commencing a first structured exploration of an original data set stored in the in-memory database, the input specifying the original data set, a first source of information external to the original data set, and a first filter criterion;
   creating, by the in-memory database engine in response to the first input, a first evidence package in the in-memory database and associated with the first structured exploration;
   applying, by the in-memory database engine in response to the first input, the first source of information and the first filter criterion to the original data set, to generate a first exploration layer comprising a first subset of the original data set matching the first source of information and the first filter criterion;
   receiving, by the in-memory database engine, a second input confirming a relevance of the first exploration level;
   storing, by the in-memory database engine in response to the second input, first evidence of the first exploration in the evidence package, the first evidence comprising the first subset, an instance of the first source of information, the first filter criterion, and an identifier of the first structured exploration;
   receiving, by the in-memory database engine, a third input comprising an instruction to display the first evidence;
   communicating, by the in-memory database engine in response to the third input, the first evidence to a screen
   receiving, by the in-memory database engine, a fourth input to continue the first structured exploration, the input specifying a second source of information external to the original data set, and a second filter criterion;
   persisting, by the in-memory database engine after receiving the fourth input, the first subset in the in-memory database outside of the evidence package;
   receiving, by the in-memory database engine, instructions to preserve a memory capacity of the in-memory database; and
   deleting, by the in-memory database engine after receiving the fourth input, the first subset from the in-memory database outside of the evidence package.

2. A method as in claim 1 wherein the first source of information is located within the in-memory database.

3. A method as in claim 1 wherein the first source of information is outside of the in-memory database.

4. A method as in claim 1 wherein the first evidence further comprises a link between the first source of information and a second source of information.

5. A method as in claim 4 wherein the link establishes a master-detail relationship between the first source of information and the second source of information.

6. A method as in claim 4 wherein the link comprises a vertical filtering link.

7. A method as in claim 1 wherein the first evidence reflects a license to the first source of information.

8. A method as in claim 1 further comprising:
   applying, by the in-memory database engine in response to the fourth input, the second source of information and the second filter criterion to the original data set, to generate a second exploration layer comprising a second subset of the original data set matching the second source of information and the second filter criterion;

receiving, by the in-memory database engine, a fifth input confirming a relevance of the second exploration level;

storing, by the in-memory database engine in response to the fifth input, second evidence of the first structured exploration in the evidence package, the second evidence comprising the second subset, an instance of the second source of information, the second filter criterion, and the identifier of the first structured exploration;

receiving, by the in-memory database engine, a sixth input comprising an instruction to display the second evidence; and communicating, by the in-memory database engine in response to the sixth input, the second evidence to the screen.

9. A method as in claim 1 further comprising:

applying, by the in-memory database engine in response to the fourth input, the second source of information and the second filter criterion to the first subset, to generate a second exploration layer comprising a second subset of the original data set matching the second source of information and the second filter criterion;

receiving, by the in-memory database engine, a fifth input confirming a relevance of the second exploration level;

storing, by the in-memory database engine in response to the fifth input, second evidence of the first structured exploration in the evidence package, the second evidence comprising the second subset, an instance of the second source of information, the second filter criterion, and the identifier of the first structured exploration;

receiving, by the in-memory database engine, a sixth input comprising an instruction to display the second evidence; and communicating, by the in-memory database engine in response to the sixth input, the second evidence to the screen.

10. A non-transitory computer readable storage medium embodying a computer program for performing a method, said method comprising:

receiving, by an in-memory database engine of an in-memory database, a first input commencing a first structured exploration of an original data set stored in the in-memory database, the input specifying the original data set, a first source of information external to the original data set, and a first filter criterion, wherein the first source of information is stored in the in-memory database;

creating, by the in-memory database engine in response to the first input, a first evidence package in the in-memory database and associated with the first structured exploration;

applying, by the in-memory database engine in response to the first input, the first source of information and the first filter criterion to the original data set, to generate a first exploration layer comprising a first subset of the original data set matching the first source of information and the first filter criterion;

receiving, by the in-memory database engine, a second input confirming a relevance of the first exploration level;

storing, by the in-memory database engine in response to the second input, first evidence of the first exploration in the evidence package, the first evidence comprising the first subset, an instance of the first source of information, the first filter criterion, and an identifier of the first structured exploration;

receiving, by the in-memory database engine, a third input comprising an instruction to display the first evidence;

communicating, by the in-memory database engine in response to the third input, the first evidence to a screen;

receiving, by the in-memory database engine, a fourth input to continue the first structured exploration, the input specifying a second source of information external to the original data set, and a second filter criterion;

persisting, by the in-memory database engine after receiving the fourth input, the first subset in the in-memory database outside of the evidence package;

receiving, by the in-memory database engine, instructions to preserve a memory capacity of the in-memory database; and deleting, by the in-memory database engine after receiving the fourth input, the first subset from the in-memory database outside of the evidence package.

11. A non-transitory computer readable storage medium as in claim 10 wherein the first evidence further comprises a link between the first source of information and a second source of information.

12. A non-transitory computer readable storage medium as in claim 10 wherein the method further comprises:

applying, by the in-memory database engine in response to the fourth input, the second source of information and the second filter criterion to the original data set, to generate a second exploration layer comprising a second subset of the original data set matching the second source of information and the second filter criterion;

receiving, by the in-memory database engine, a fifth input confirming a relevance of the second exploration level;

storing, by the in-memory database engine in response to the fifth input, second evidence of the first structured exploration in the evidence package, the second evidence comprising the second subset, an instance of the second source of information, the second filter criterion, and the identifier of the first structured exploration;

receiving, by the in-memory database engine, a sixth input comprising an instruction to display the second evidence; and communicating, by the in-memory database engine in response to the sixth input, the second evidence to the screen.

13. A non-transitory computer readable storage medium as in claim 10 further comprising:

applying, by the in-memory database engine in response to the fourth input, the second source of information and the second filter criterion to the first subset, to generate a second exploration layer comprising a second subset of the original data set matching the second source of information and the second filter criterion;

receiving, by the in-memory database engine, a fifth input confirming a relevance of the second exploration level;

storing, by the in-memory database engine in response to the fifth input, second evidence of the first structured exploration in the evidence package, the second evidence comprising the second subset, an instance of the second source of information, the second filter criterion, and the identifier of the first structured exploration;

receiving, by the in-memory database engine, a sixth input comprising an instruction to display the second evidence; and communicating, by the in-memory database engine in response to the sixth input, the second evidence to the screen.

14. A computer system comprising:

one or more processors;

a software program, executable on said computer system, the software program configured to cause an in-memory database engine of an in-memory database to:

receive a first input commencing a first structured exploration of an original data set stored in the in-memory database, the input specifying the original data set, a first source of information external to the original data set, and a first filter criterion;

create in response to the first input, a first evidence package in the in-memory database and associated with the first structured exploration;

apply in response to the first input, the first source of information and the first filter criterion to the original data set, to generate a first exploration layer comprising a first subset of the original data set matching the first source of information and the first filter criterion;

receive a second input confirming a relevance of the first exploration level;

store in response to the second input, first evidence of the first exploration in the evidence package, the first evidence comprising the first subset, an instance of the first source of information, the first filter criterion, and an identifier of the first structured exploration;

receive a third input comprising an instruction to display the first evidence;

communicate in response to the third input, the first evidence to a screen;

receive a fourth input to continue the first structured exploration, the fourth input specifying a second source of information external to the original data set, and a second filter criterion;

persist the first subset in the in-memory database outside of the evidence package;

receive instructions to preserve a memory capacity of the in-memory database; and delete, after receiving the fourth input, the first subset from the in-memory database outside of the evidence package;

apply in response to the fourth input, the second source of information and the second filter criterion to the original data set, to generate a second exploration layer comprising a second subset of the original data set matching the second source of information and the second filter criterion;

receive a fifth input confirming a relevance of the second exploration level;

store second evidence of the first structured exploration in the evidence package, the second evidence comprising the second subset, an instance of the second source of information, the second filter criterion, and the identifier of the first structured exploration;

receive a sixth input comprising an instruction to display the second evidence; and communicating, by the in-memory database engine in response to the sixth input, the second evidence to the screen.

15. A computer system as in claim 14 wherein the first evidence further comprises a link between the first source of information and the second source of information.

16. A computer system as in claim 14 wherein the first source of information is located within the in-memory database.

* * * * *